June 28, 1955 — L. A. HAUTAU ET AL — 2,711,817
MECHANICAL LOADER AND UNLOADER FOR PRODUCTION MACHINES
Filed June 2, 1954 — 10 Sheets-Sheet 1

INVENTORS
Llewellyn A. Hautau
Charles E. Hautau

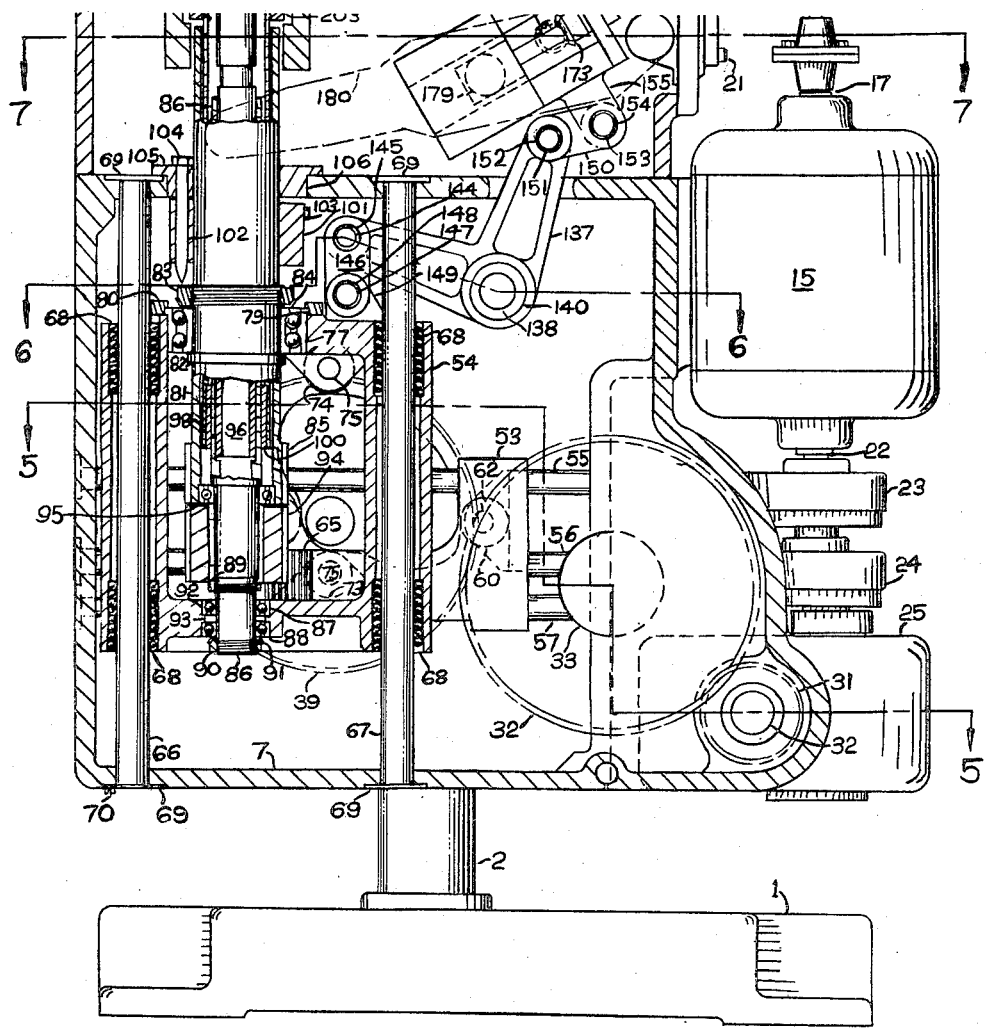
FIG.2-A

June 28, 1955     L. A. HAUTAU ET AL     2,711,817
MECHANICAL LOADER AND UNLOADER FOR PRODUCTION MACHINES
Filed June 2, 1954     10 Sheets-Sheet 3
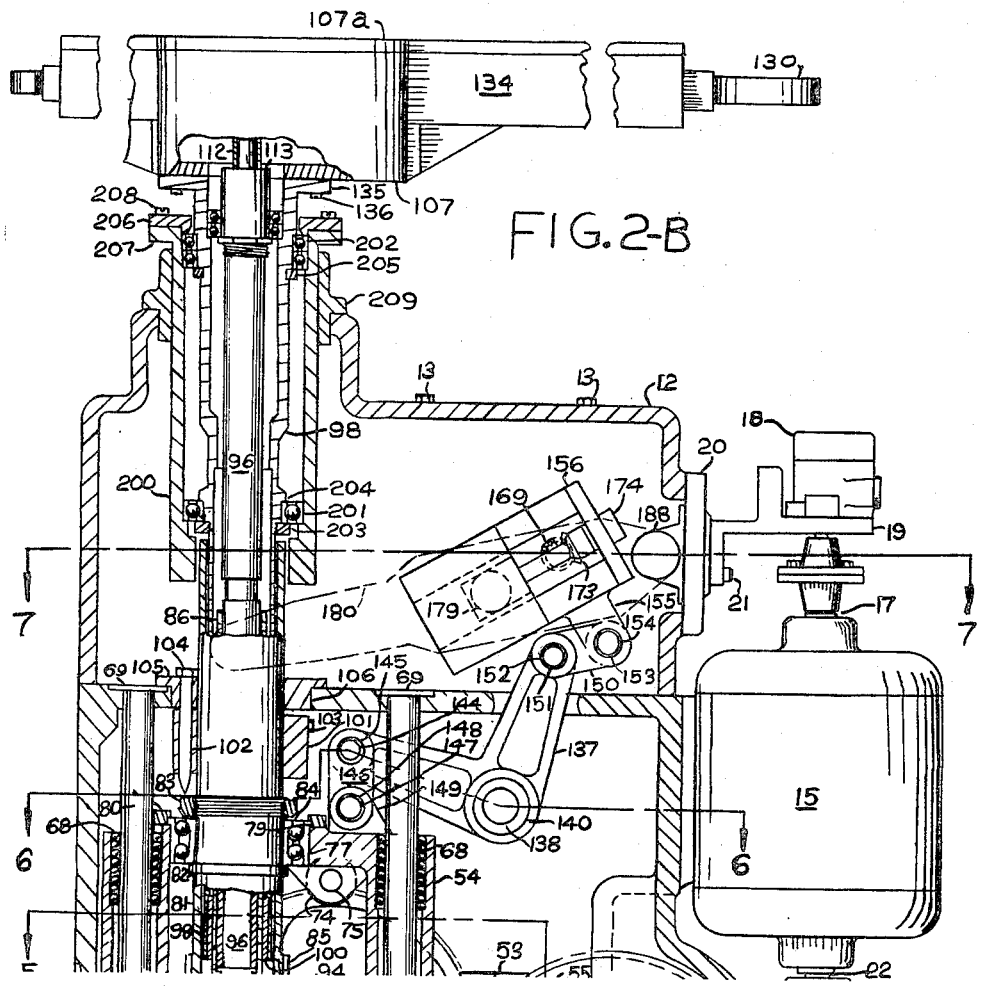
FIG.2-B
INVENTORS
Llewellyn A. Hautau
Charles F. Hautau

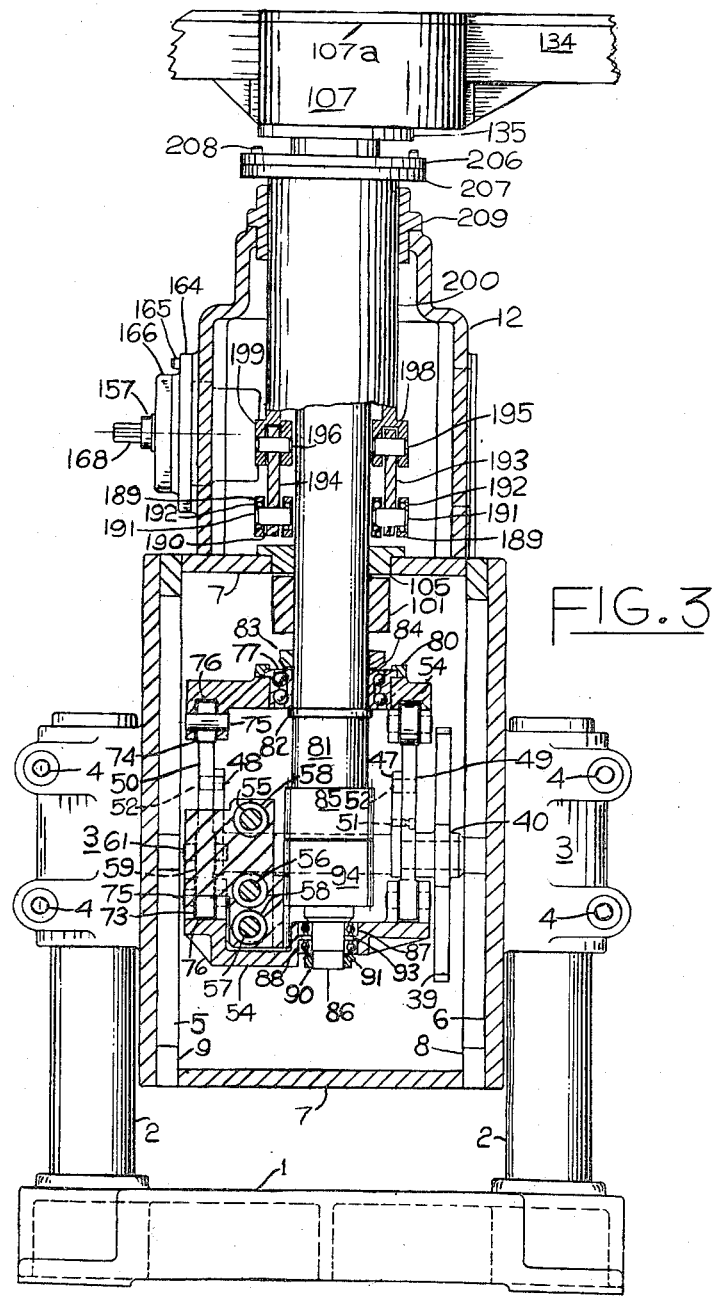

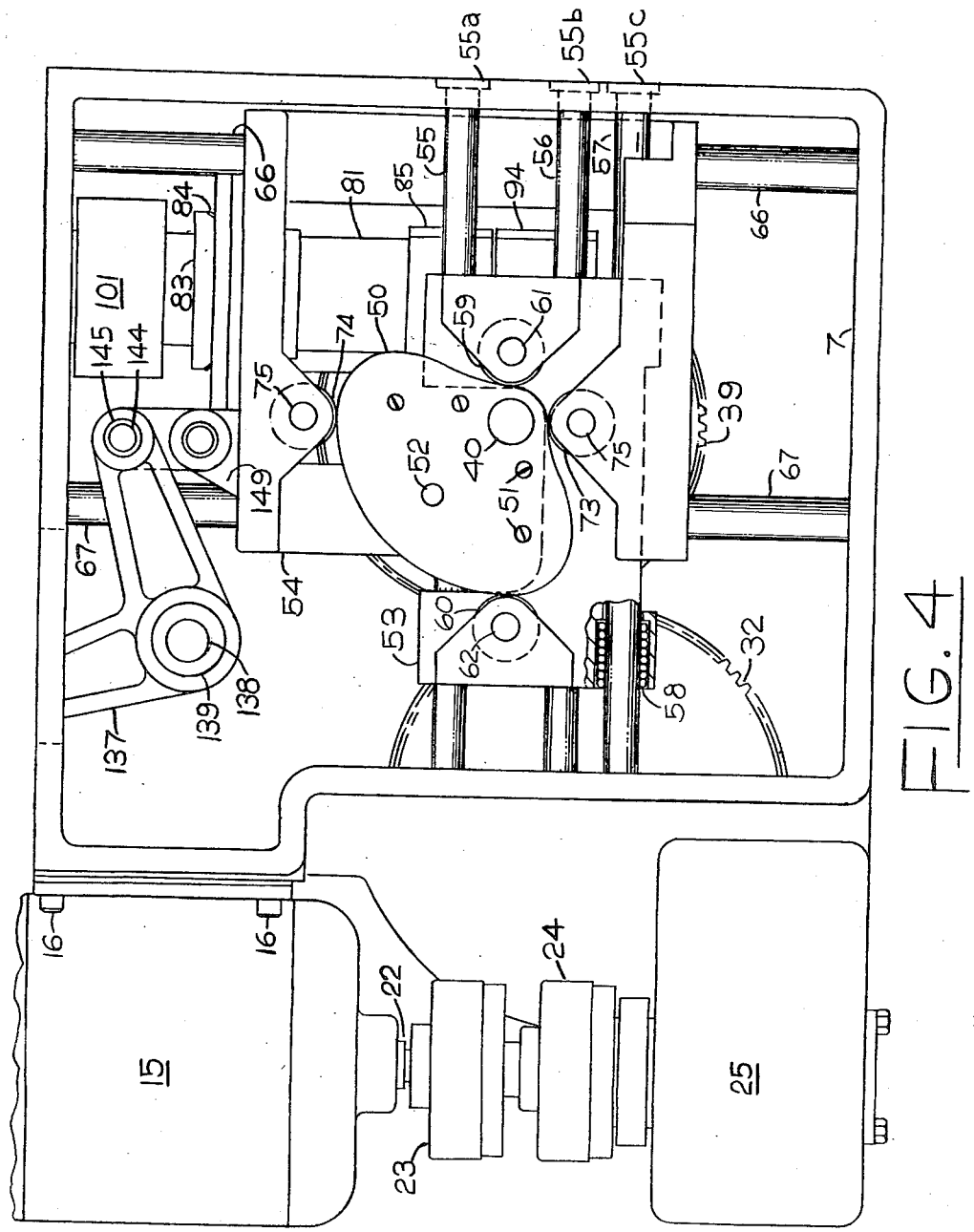

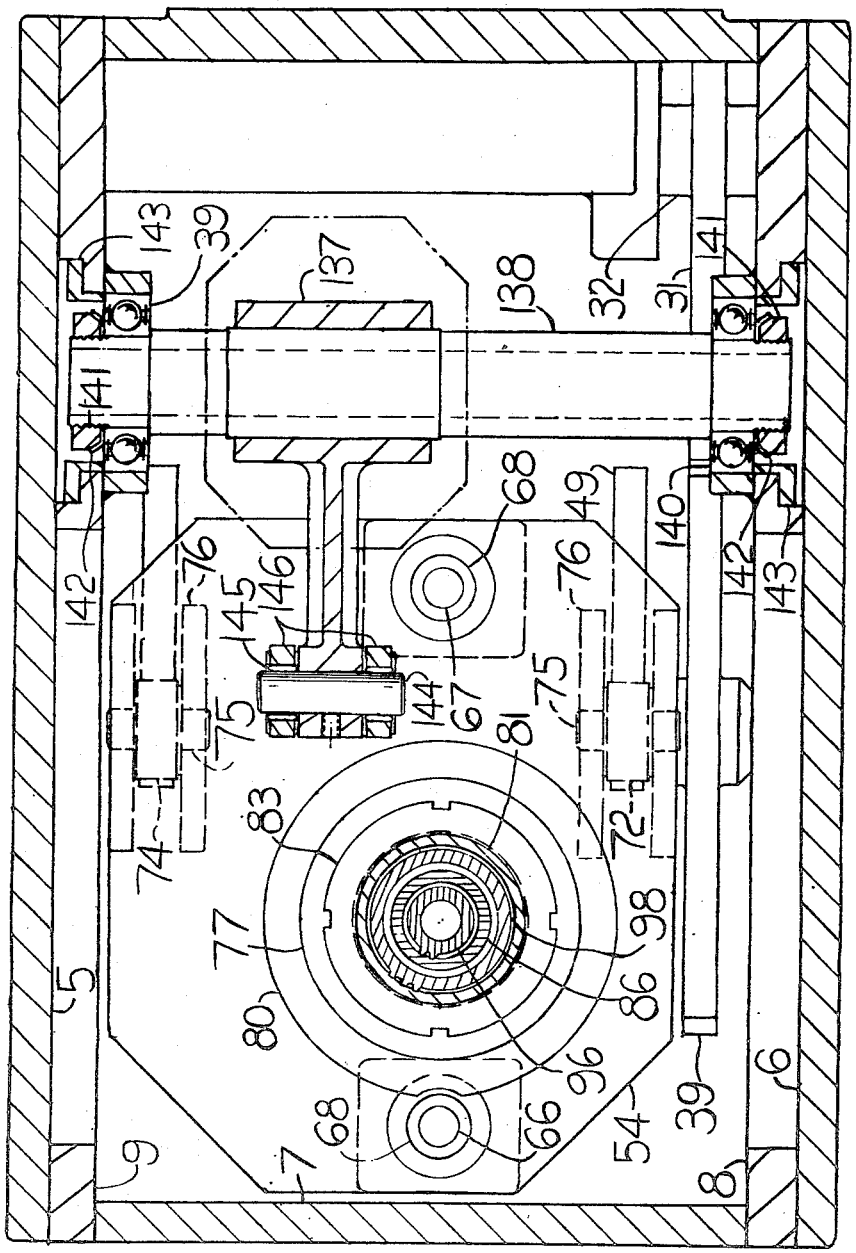

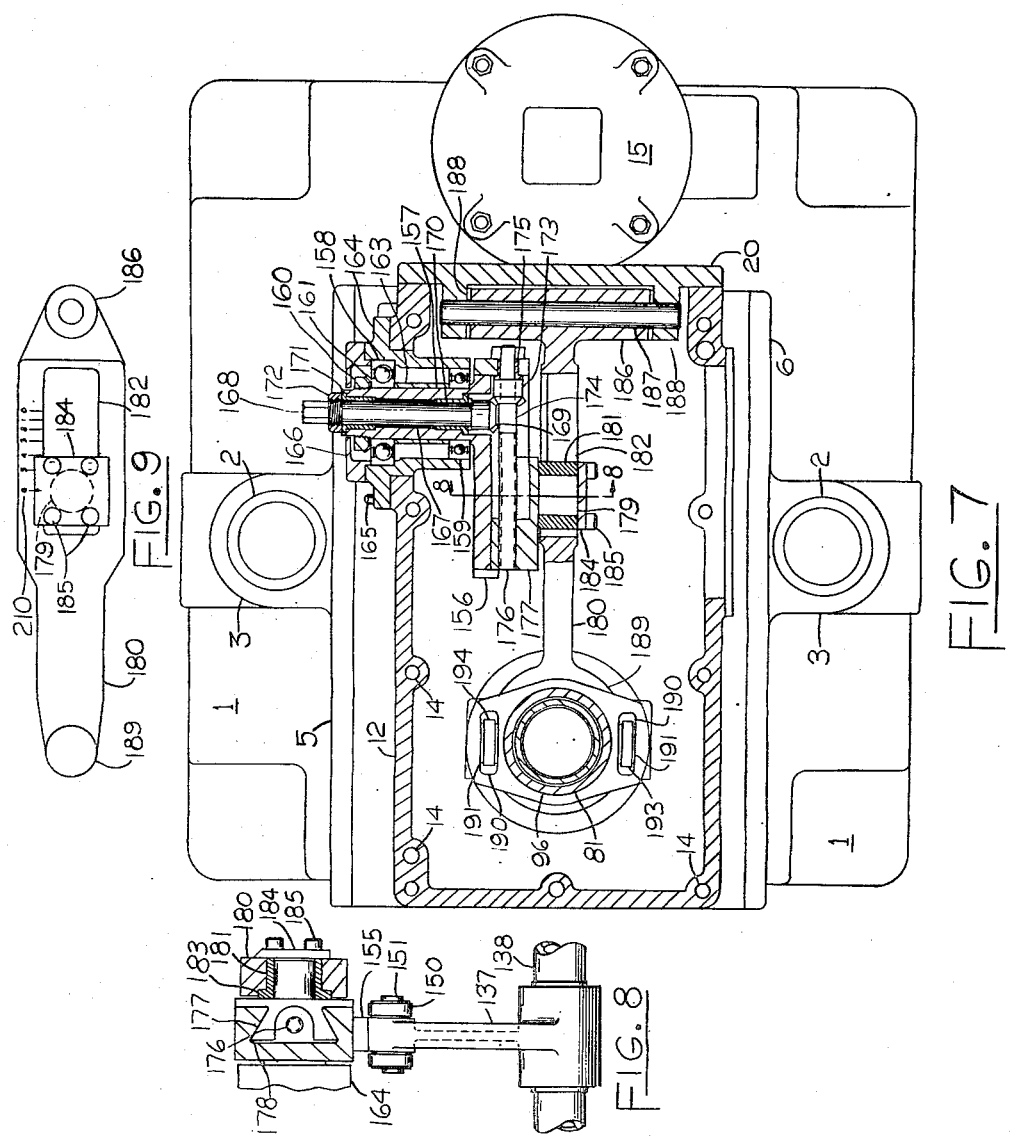

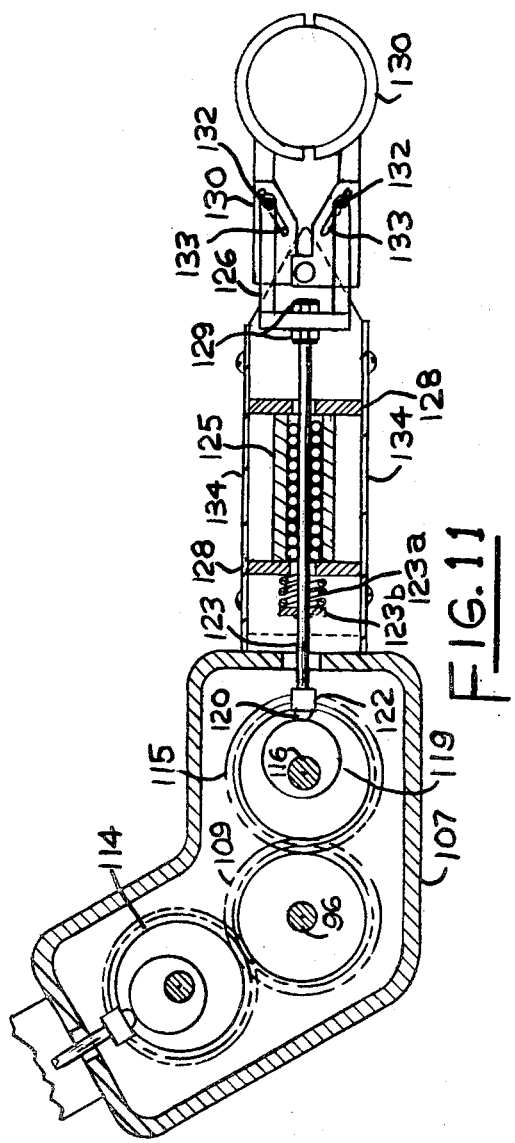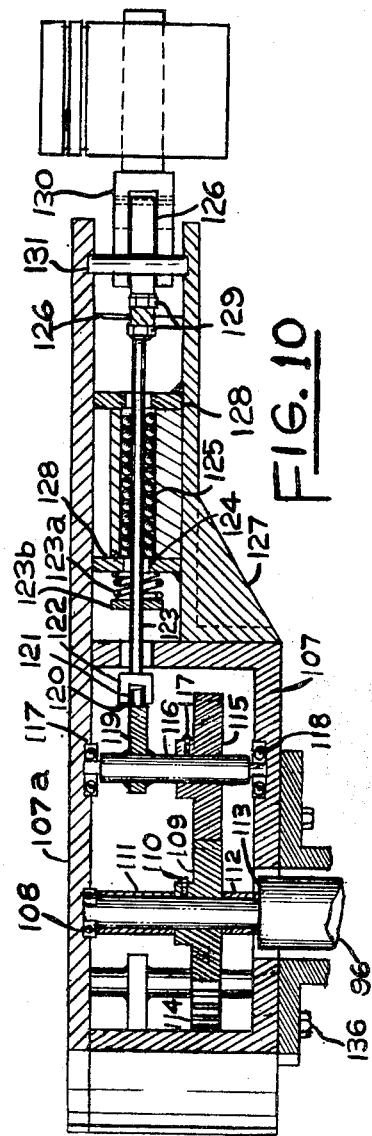

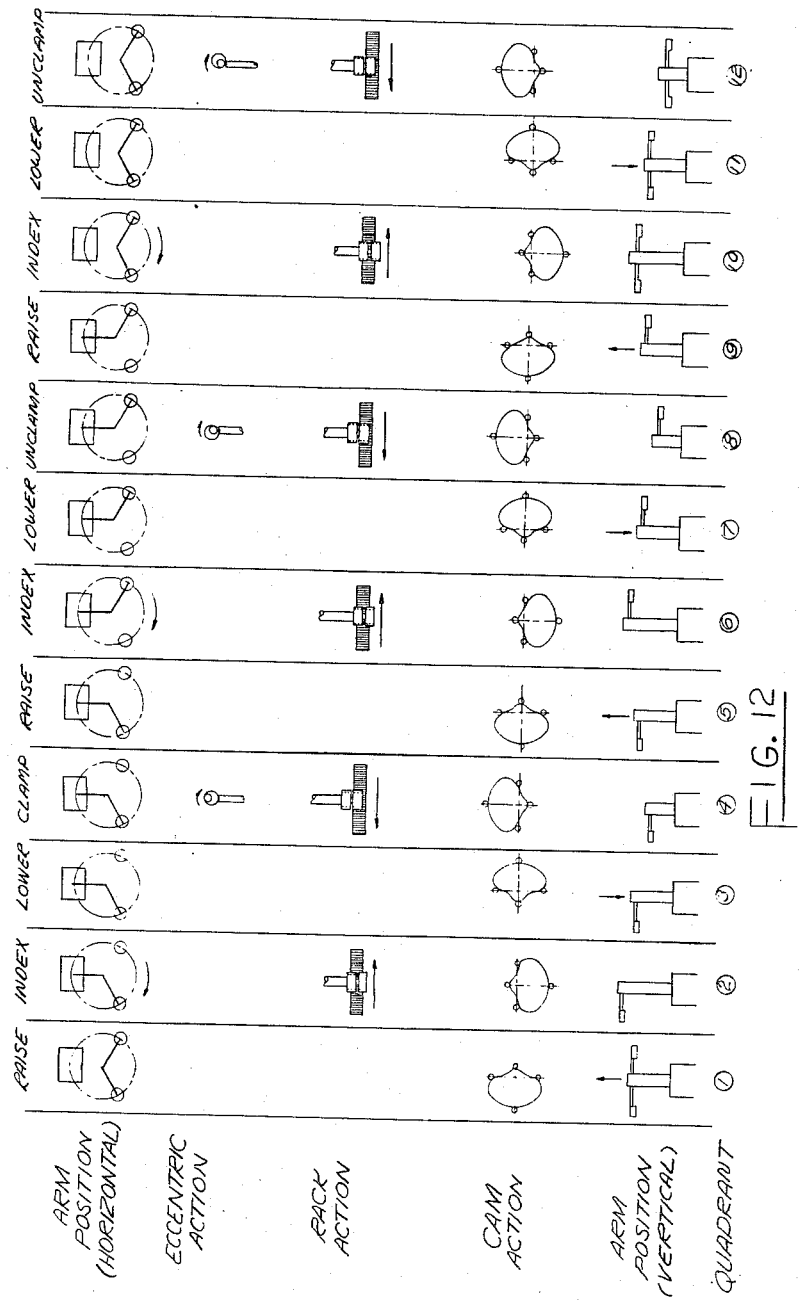

United States Patent Office 2,711,817
Patented June 28, 1955

2,711,817

MECHANICAL LOADER AND UNLOADER FOR PRODUCTION MACHINES

Llewellyn A. Hautau, Detroit, and Charles F. Hautau, Huntington Woods, Mich.

Application June 2, 1954, Serial No. 434,047

10 Claims. (Cl. 198—210)

This invention relates to a loader and unloader for production machines and more particularly to a mechanically actuated rotary indexing loader and unloader for production machinery.

It is an object of the present invention to provide a mechanism that can be used to both load and unload a production machine.

Another object is to provide a loader that will be easily adaptable to a wide variety of machines and work pieces. The present mechanism may be readily adjusted so as to satisfy the loader requirements of many mass production situations.

A further object of the present invention is to provide a loader that can operate between several adjacent machines, eliminating the need for conveyors and unloading equipment.

A further object is to provide a loader that is self-supporting to adjustable heights.

A further object is to provide a mechanism that lends itself to use in timed sequence with production equipment.

Another object is to provide a loader that will greatly increase the production rate of a machine with respect to its manually loaded rate, and with respect to the same machine equipped with loaders as now generally employed. This object is accomplished through the use of several novel modes of operation. The loader is basically mechanical in its operation, requiring electrical components for its power source only. By thus eliminating all hydraulic and pneumatic actuation, the usual mode of operation of similar machinery, much higher rates of operation are made possible since the inherent time delays of fluid pressure systems are eliminated. A further increase in the operational rate with respect to conventional machines is accomplished by using cycloidally generated cams to actuate the loading steps. Since the cycloidal shaped cam used produces a zero acceleration at the start of each cycle of motion, the cams can be rotated at higher speeds than are possible with the usual cams, which are harmonically generated and therefore have maximum acceleration at the start of each cycle.

Basically the present invention consists of several arms extending radially from a central hub, and carrying at their ends work clamps. The arms are raised, lowered and rotated and the clamps opened and closed through the actions of a cam actuated mechanism which is powered by an electric motor.

Other objects, advantages and applications of the invention will become apparent by reference to the following embodiment in which:

Figs. 2A and 2B are halves of an elevation view of the loader.

Fig. 3 is an elevation section taken along lines 3—3 of Fig. 5.

Fig. 4 is an elevation view of the lower part of the loader taken from the reverse side of the view of Fig. 2.

Fig. 6 is a plan section taken along lines 6—6 of Fig. 2.

Fig. 7 is a plan section taken along lines 7—7 of Fig. 2.

Fig. 8 is a detailed section of the loader's adjustment mechanism taken along line 8—8 of Fig. 7.

Fig. 9 is a detail of the stroke adjustment arm.

Fig. 10 is an elevation view of the loader head and arms.

Fig. 11 is a plan view of the head and arms.

Fig. 12 is a diagram clarifying the loaders operational cycle.

Figure 1:
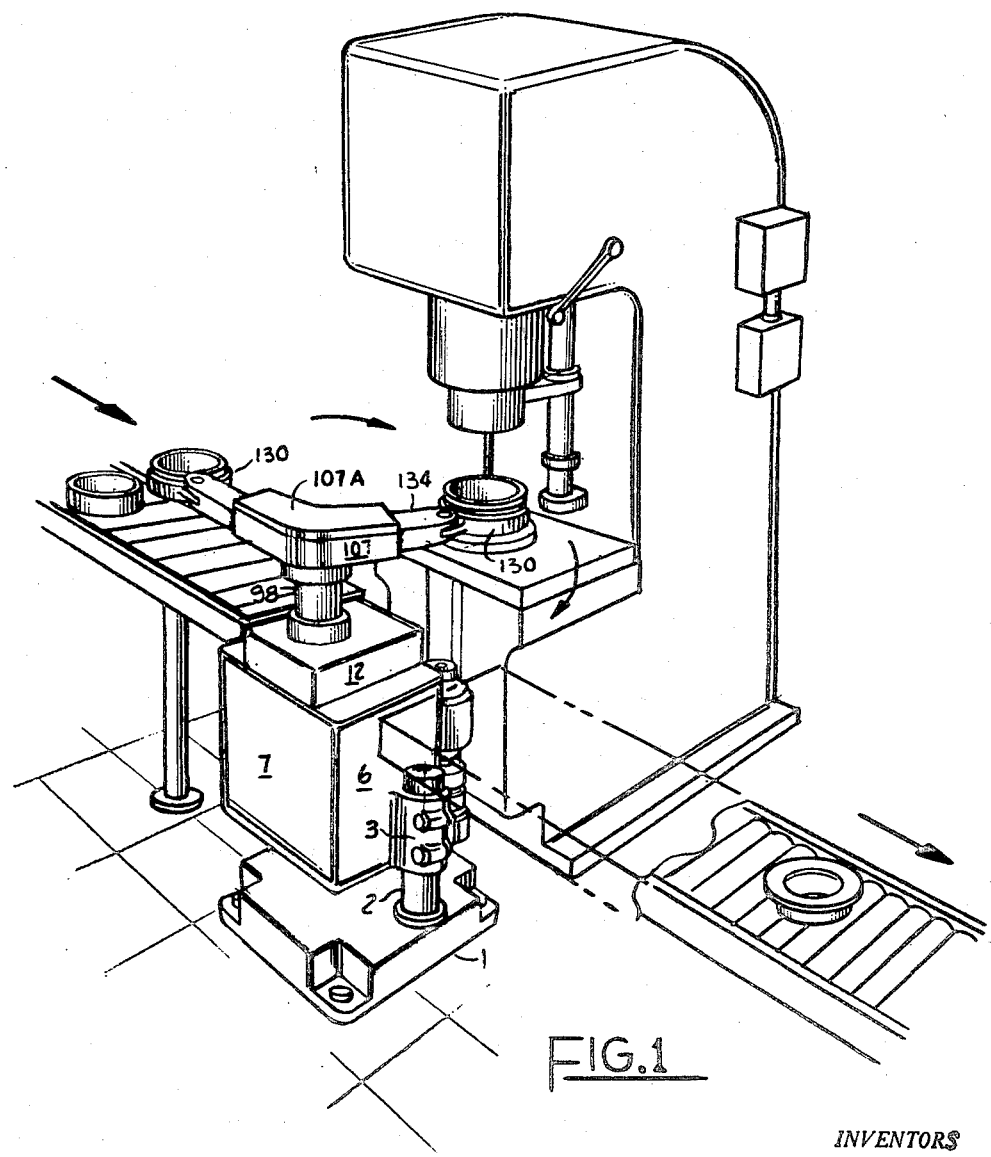
Fig. 1 is a perspective view of the loader operating with a press, a feeding conveyor, and a removing conveyor.

The loader is mounted on a heavy cast base 1 which supports two hollow, vertical, cylindrical columns 2. Two clamps 3, which tighten on the columns 2 by means of bolts 4, are integral with two side plates 5 and 6 of a lower housing 7. Mounted between the side plates 5 and 6 and the housing 7 are two shaft carrying plates 8 and 9 which are fastened to the housing 7 by bolts 10. The side plates 5 and 6 are fixed to the shaft carrying plates 8 and 9 by bolts 11.

An upper housing 12 is fastened to the lower housing 7 by long bolts 13 which pass through holes 14 in sides of the upper housing.

The loader is powered by an electric motor 15 which is fixed to the lower housing 7 by bolts 16. The motor is double extended and the upper end of its shaft 17 drives a gear type lubrication pump 18. The pump is mounted on a shelf 19 which is fixed to a side plate 20 of the upper housing 12 by bolts 21.

The lower end 22 of the motor's 15 shaft is connected to an electric clutch 23. The clutch 23 drives an electric brake 24 which in turn drives a conical geared speed reducer 25. The reducer 25 is fixed to the lower housing 7 by bolts 25a. The speed reducer's 25 output shaft 26 is journaled in two ball bearings 27 and 28. One ball bearing 27 is retained in a recess 29 in the lower housing 7 while the other ball bearing 28 is retained in the shaft carrying plate 8 by a collar 30. A gear 31 with a double flanged neck 32 is keyed on the shaft 26 and the necks serve to retain the bearings 27 and 28.

The speed reducers output gear 31 drives a larger gear 32 which also has a double flanged neck 33 and is keyed on another shaft 34. The shaft 34 is journaled in ball bearings 35 and 36. Bearing 35 is retained in a recess 37 in the lower housing 7 by the gear neck 33. Bearing 36 is retained in the shaft carrying plate 8 by the neck 33 and a collar 38.

The gear 32 drives a third gear 39 which is the same size as gear 32. Gear 39 is keyed to a shaft 40, which is journaled in ball bearings 41 and 42 and retained by nuts 43, which thread on to the ends of the shaft, and lockwashers 44. The bearing 41 is retained in one side of the lower housing 7 by a collar 45. The bearing 42 is retained on the opposite side of the housing 7 by a collar 46.

Two flanges 47 and 48 are integral with the shaft and cycloidally generated cams 49 and 50 are fixed to them by bolts 51 and positioning dowels 52.

The cams 49 and 50 drive two carriers 53 and 54. Carrier 53 moves in the horizontal plane while carrier 54 moves in the vertical plane.

The horizontal carrier 53 moves along three horizontal shafts 55, 56 and 57 by means of ball bushings 58, which are retained in the carrier.

The shafts 55, 56 and 57 are retained in the lower housing 7 by caps 55a, 56a and 57a which are fixed in the housing by screws 55b. The carrier 53 rides one cam 50, by two roller type cam followers 59 and 60 which are both continually bearing on the cam. They are retained on shafts 61 and 62 which are mounted in recesses 63 and 64 in the carrier 53. A gear rack 65 is cut along one vertical surface of the carrier 53.

The vertical carrier 54 moves along two vertical shafts 65 and 67 by means of ball bushings 68 which are retained in the carrier. The shafts 67 and 68 are retained in the lower housing 7 by caps 69 that are fixed to the housing by screws 70. The carrier 54 rides the cam 49 by means of the roller cam followers 71 and 72, and it also rides the cam 50 by means of cam followers 73 and 74. Both pairs of followers are continually bearing on the cam. The followers 71, 72, 73 and 74 are retained on the carrier by shafts 75 which are mounted in recesses 76 in the carrier 54.

A ball bearing 77 is retained in a hole 78 in the upperside of the vertical carrier 54 by means of a lip 79 on the bearing 77 and a collar 80. A vertical shaft 81 is journaled in the bearing 77 and is retained by a shoulder 82 on the shaft 81, a nut 83 which threads on the shaft 81 and a lock washer 84. A gear 85 is integral with the shaft 81 at its lower end. It is so positioned as to mesh with the gear rack 65 of the horizontal carrier 53.

A second vertical shaft 86 which is internal to and concentric with shaft 81 is journaled in two bearings 87 and 88 and is retained in them by two nuts 89 and 90 which thread on the shaft, and by a lockwasher 91.

The bearings 87 and 88 are retained in a hole 92 in the lower side of the vertical carrier 54. They are separated by a shoulder 93 in the hole 92, and are retained by the nuts 89 and 90.

A gear 94 is keyed on the shaft 86 directly below the gear 84. The gear 94 is retained by the nut 89 and a ball bearing 95 which is journaled in setbacks in shafts 81 and 86 and acts between the two shafts. The gear 94 is so positioned with respect to the horizontal carrier 53 as to be in mesh with its gear rack 65 when the shaft 86, which moves with the vertical carrier 64, is in its lower position.

Figure 5:
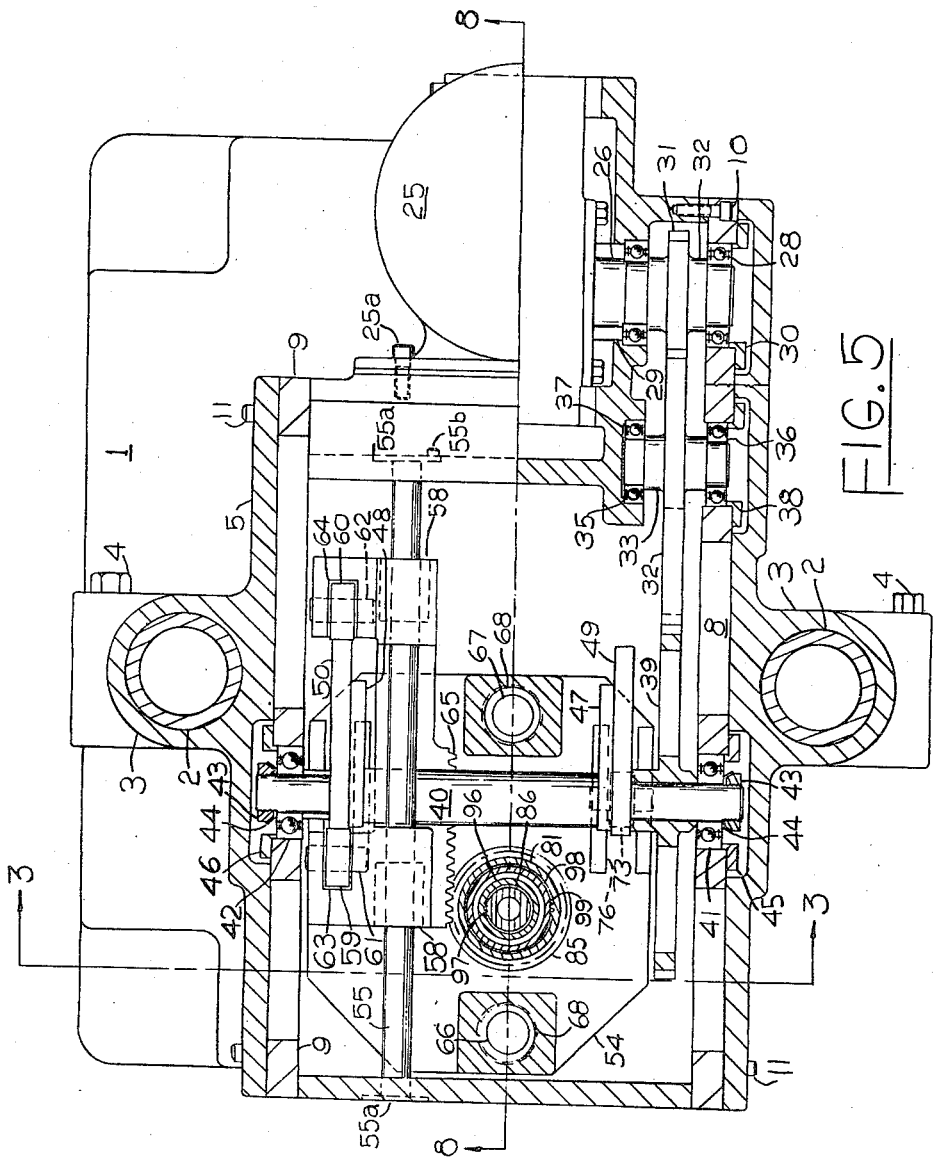
Fig. 5 is a sectional view taken along lines 5—5 of Fig. 2A.

A shaft 96 is external to and concentric with the shaft 86 and is splined to it by splines 97 as is seen in Fig. 5.

Another shaft 98 is internal to and concentric with shaft 81 and is splined to it by splines 99. Shafts 96 and 98 are separated and kept concentric at their lower ends by a bronze sleeve bearing 100.

A collar 101 with holes 102 drilled in it is fixed to shaft 81 by a screw 103. A shot pin 104 is mounted on a collar 105 enclosing the hole 106 in the lower housing 7 through which the shaft 81 passes. The holes 102 are so positioned with respect to the shot pin 104 that when the shaft 81 rises with the vertical carrier 54 the pin mates into one of the holes, locking the shaft 81 against rotation.

The shaft 96 extends up through the center of the upper housing 12 to the head 107 when it is journaled in a ball bearing 108 which is retained in the top plate of the head 107. A gear 109 is locked to the shaft 96 near its upper end by a set screw 110, and is retained by spacer tubes 11, and 12 which stand between the gear 109 and the top plate, and the gear and a shoulder 113 on the shaft 96. The gear 109 drives two other gears 114 and 115 which are the same size as gear 109.

Gear 114 drives the clamping mechanism of one arm while gear 115 drives that of the other arm. Since the arms are identical only the one driven by gear 115 will be described. Gear 115 is fixed to a shaft 116 by a set screw 117. The shaft 116 is journaled in two ball bearings 117 and 118. Bearing 117 is retained in the head housing 107 while bearing 118 is retained in the top plate 107A. An eccentric 119 is welded to the shaft 116. It actuates a roller follower 120 which is carried on a shaft 121 in a U-shaped carrier 122. The carrier 122 actuates a rod 123 which passes through a hole 124 in the head 107, through a ball bearing gib 125, and terminates in a cross head 126. The gib 125 is supported between a lower arm plate 127 and the cover plate 107A by two bulkheads 128. The rod 123 connects to the crosshead 126 between two nuts 129 which thread on the rod. The rod 123 is biased towards the cam 119 by a spring 123a which acts against a ring 123b which is welded to the rod 123. Two clamping arms 130 pivot about a pin 131 which is mounted vertically between the arm plate 127 and the top plate 107A and positioned in recesses in the plates. Pins 132, carried on the ends of the crosshead pass slidingly through slots 173 in the clamping arms 130. The arms are covered by sheet metal side plates 134. Thus an outward motion of the rod 123 caused by a rotation of the eccentric 119, closes the clamping arms 130, and an inward motion opens them. The clamping action is therefore controlled by the rotation of shaft 96.

The shaft 98 also extends upward through the upper housing 12 terminating in a flanged end 135 which is bolted to the head housing 107 by bolts 136. A rotation of shaft 98 therefore turns the head and arms.

The head and arms are lifted and lowered through the action of an adjustable stroke "Scotch yoke." A bell crank 137 is keyed to a shaft 138 which is journaled in two ball bearings 139 and 140 and retained by nuts 141 which thread on the shaft 138, and lock washers 142. The bearings 139 and 140 are retained in the shaft carrying plates 8 and 9 by shoulders on the shaft 138 and by collars 143.

One end of the bell crank 137 is connected through a pin 144 to a connecting link 146. The other end of the link 146 connects through a second pin 147 and needle bearing 148 to a coupling 149 integral with the vertical carrier 54. An upward motion of the carrier 54 therefore acts through the link 146 to rotate the bell crank 137 in a clockwise direction as viewed from the position of Figs. 2A and 2B.

The other end of the bell crank 137 connects to a link 150 through a pin 151 riding on needle bearings 152. This link 150 ends in another pin 153 and needle bearings 154 in a coupling 155 that is an integral part of the yoke block 156. The block 156 has a cylindrical neck 157 as seen in Fig. 7, which is journaled in two ball bearings 158 and 159, and retained in them by a nut 160, which threads on the neck 157, a lockwasher 161 and a shoulder 162 on the neck 157. The bearings 158 and 159 are separated by a spacer tube 163. The bearings are retained in a cylindrical housing 164 that is fixed to the upper housing 12 by bolts 165, and by a collar 166 which also serves to keep the bearings 158 and 159 clean.

A shaft 167 runs through the center of the neck 157. It has a wrench surface 168 on one end and a bevel gear 169 on the other. It turns in the neck 157 or two bronze bearings 170 and 171. It is retained by a lock nut 172. The geared end 169 meshes with another bevel gear 178 which is keyed on a second shaft 174. One end of the shaft 174 is journaled in a bronze bearing 175 which is retained in the block 156. The other end 176 is threaded and mates in a dovetail shaped slider block 177. The slider 177 mates in a dovetailed slot 178 in the yoke block 156. A rotation of the shaft 174 as produced by a rotation of shaft 167 thus moves the slides 177 along the slot 178.

A pin 179 is integral with the slider 177 and serves to communicate the motion of the block 156 to an arm 180 through a bearing 181 which is free to slide along a groove 182 in the arm 180. The bearing 181 is retained by its shoulders 183. A cover plate 184 keeps the bearing clean. It is retained by screws 185.

The arm 180 has a cylindrical end 186 which is perpendicular to the axis of the arm and acts as a bearing about a shaft 187. The shaft 187 is fixed in two retainers 188 which are integral with the side plate 20. At its other end 189 the arm 180 surrounds the shaft 81 and has two slots 190 which carry pins 191 in ball bearings 192 as is seen in Fig. 3. The pins pass through two connecting links 193 and 194. The upper end of the links connects through pins 195 and 196, to forked segments 198 and 199 on the shaft 200 which is concentric and external to the shafts 96 and 98.

The shaft 200 connects with shaft 98 through two ball bearings 201 and 202. Bearing 201 is retained by a nut 203 which threads on the shaft 98 and shoulder 204 on the shaft 98. Bearing 202 is a double race ball bearing and is retained by a ring 205 which fits in a groove in shaft 98 and by a collar 206 which is fixed to a flange 207 on shaft 200 by bolts 208. The shaft 200 bears on a bronze collar 209 which is fixed in the top of the upper housing 12.

*Operation.*—The loader is started by energizing the electric motor 15, engaging the clutch 23, and disengaging the brake 24. The rotative power is communicated through the speed reducer 24 and the gears 32 and 29 to the shaft 40 which carries the cams 49 and 50.

The cams are so generated as to move either the vertical carrier 54 or the horizontal carrier 53 from one extreme position of that carrier's travel to the other extreme position during any 90° of cam rotation.

During the same 90° that one carrier is being moved by the cam the other carrier is stationary, its followers dwelling on the cam's lobes.

During the next 90 degrees of cam rotation the activities of the carriers reverse, the one that was previously moving dwells and the one that was dwelling moves to the other extreme of its travel. Thus the two carriers alternately travel and dwell, one always moving and one always stationary.

The cams are generated from cycloidal functions rather than the normal harmonic functions. This produces a zero acceleration in the carriers at the beginning of their motion rather than the maximum acceleration produced by the harmonic cam. Thus the cams may be rotated at relatively high speeds and the motion of the carriers is free of shock.

When the vertical carrier 54 moves upward it acts through the "Scotch yoke" to lower the shafts 98 and 200, the head, and arms. When the carrier lowers it raises the shafts, head and arms. The action is as follows: The carrier 54 raises and acts through the link 146 to rotate the bell crank 137 in a clockwise sense as viewed from the position of Figs. 2A and 2B. The crank's motion is communicated through the link 150 to the yoke block 156, acting so as to rotate the block in a counterclockwise sense (again from the standpoint of Figs. 2A and 2B) about its neck 157. The motion of block 156 is transmitted through the pin 179 to the arm 180, causing it to rotate, also in a counterclockwise sense, about the shaft 187. The arm 180 acts through the links 193 and 194 to raise the shaft 200, the motion of which is communicated to the head and arms.

To make the loader flexible in its application provision is made to vary the lift of the head and arms. The position of slider 177 along the dovetail slot 178 of block 154 may be adjusted by turning shaft 167, the motion of which is communicated through the bevel gears 169 and 173 to the shaft 174. A rotation of shaft 174 screws the block 177 along the shaft's 174 threads. Thus the radius of rotation of the pin 179 is varied. This varies the motion imparted to the arm 180, varying the stroke of the head and arms. The stroke is calibrated on the arm 180 by the figures 200. The shaft 167 is turned until the arrow on cover 184 is aligned with the desired stroke.

When the vertical carrier 54 moves it also shifts the gear 85 into and out of mesh with the gear rack 65 since the gear 85 is carried on shaft 81 which moves with the carrier 54. The relationship of the gear and rack are such that when the carrier 54 is lifted the gear and rack are out of mesh and when the carrier is in its lowered position they are in mesh.

The gear 94, carried on the shaft 86, also moves with the vertical carrier but it is so positioned as to always be in mesh with rack 65.

Thus the gear 94 turns whenever the horizontal carrier 53 moves since the rack 65 is integral with that carrier, and the gear 85 turns on alternate motions of the carrier. Each motion rotates the gears through 120 degrees.

The rotation of the gear 85 acts through its shaft 81, the splines 99, and shaft 98 to rotate the head and arms through 120 degrees.

The rotation of gear 94 acts through its shaft 86, splines 97, shaft 96, and gear 109 to rotate gears 114 and 115. Gear 115 acts through its shaft 116 to rotate the eccentric 119. The eccentric acts against the follower 120 moving the rod 123 which in turn acts through the pins 132 to close the work clamps 130. The eccentric 119 is so shaped and positioned as to close the clamps 130 once in each complete revolution. When the vertical carrier 54 is down, so that both gears 85 and 94 are rotated by the motion of the horizontal carrier 53, the eccentric is not rotated since the head is also rotating and there is no relative motion between the head and the shaft 96. Therefore the work clamps 130 are actuated only once in each three rotations of the cams 49 and 50.

The complete cycle of the loader is summarized in Fig. 12. The diagram is divided into 90 degrees of cam (49 and 50) rotation. It requires three complete rotations of the cam to complete a cycle.

Assuming an arbitrary starting point with the loader arms at the input and output conveyors, the arms down and the clamps open:

1. During the first 90° of cam rotation the horizontal carriers remains fixed while the vertical carrier lowers, raising the arms and bringing the upper gear (index) into mesh with the rack.

2. During the next 90° the vertical carrier remains fixed while the horizontal carrier moves away from the motor, causing the rack to rotate both gears through 120°. Since the clamp gear remains fixed with respect to the index gear the clamps remain open while the arms move through 120 degrees to positions over the input station and the press.

3. During the next 90° the horizontal carrier remains fixed while the vertical carrier raises, lowering the arms and shifting the index gear out of mesh with the rack.

4. During the next 90° the vertical carrier remains fixed while the horizontal carrier moves towards the motor, the rack causing the clamp gear to rotate through 120°. This rotates the gear in the head 120° and causes the eccentrics in the head to close the clamp. The arm at the press clamps on a finished piece while the arm at the input conveyor clamps on a blank workpiece.

5. During the next 90° the horizontal carrier remains fixed while the vertical carrier lowers, raising the arms and shifting the index gear into mesh with the rack.

6. During the next 90° the vertical carrier remains fixed while the horizontal carrier moves away from the motor, rotating both the index and clamp gears through 120°. Again there is no clamping action since the clamp and index gears remain stationary with respect to each other. The arms consequently index through 120° to a position where one arm is over the press while the other is over the output conveyor.

7. During the next 90° of cam rotation the horizontal carrier remains fixed while the vertical carrier moves upward, lowering the arms and shifting the index gear out of mesh with the rack.

8. During the next 90° the vertical carrier remains stationary while the horizontal carrier moves towards the motor rotating the clamp gear through 120°. This action is communicated to the head gears which rotate the eccentric through 120° opening the clamps and freeing the workpieces.

9. The next 90° rotation of the cam keeps the horizontal carrier stationary and moves the vertical carrier downward, raising the arms and shifting the index gear into mesh with the cam.

10. The next 90° cam rotation keeps the vertical carrier stationary and moves the horizontal carrier away from the motor, rotating both gears through 120° and causing the arms to index to their next position, one arm over the input carrier and one over the output. At this position a limit switch closes allowing press's ram to lower.

11. On the next 90° cam rotation the horizontal carrier remains stationary while the vertical carrier rises, lowering the arms and shifting the index gear out of mesh with the rack.

12. On the next 90° the vertical carrier stays fixed while the horizontal carrier shifts towards the motor, rotating the clamp gear through 120°. This rotates the eccentric through 120° but there is no clamping action since the eccentric is still in a neutral position. This brings the cycle back to point 1. The clutch now disengages and the brake engages until the press ram raises, unless it has already raised, at which time the clutch activates and the brake de-activates and the cycle begins again.

Having thus described the invention what is claimed as new and desired to be secured by Letters Patent is:

1. A mechanism of the type described comprising; a source of rotative power; an electrically actuatable clutch drivingly connected to said power source; a cam driven by the output shaft of said clutch; an electrically actuatable brake arranged so as to brake the output shaft of said clutch; a first carrier driven by said cam reciprocally along a line; a second carrier driven by said cam reciprocally in a line perpendicular to the line path of said first carrier; a gear rack fixed to said first carrier; a first hollow shaft rotatably attached to and carried by said second carrier, the axis of said first shaft being parallel to the path of motion of said second carrier; a gear drivingly attached to said first shaft and so arranged as to be in mesh and driven by aforesaid gear rack when said second carrier is at one extreme of its position, and to be out of mesh with aforesaid gear rack when said second carrier is at the other extreme of its position; a second shaft internal to and rotatably carried by said first shaft; a gear drivingly attached to said second shaft and so positioned as to be in mesh with and driven by aforesaid gear rack; a third shaft co-linear with and drivingly splined at one end to said first shaft; a fourth shaft co-linear with and drivingly splined at one end to said second shaft, said fourth shaft being internal to said third shaft; means for reciprocating said third and fourth shafts along the line of their axis, said means consisting of a bell crank, one end of which is rotated by said second carrier, a first arm, one end of which is pivotably fixed relative to the entire mechanism, said first arm being arranged so as to be pivoted by the motion of said bell crank, a second arm pivotably fixed with respect to the entire machine at one end and attached to said third and fourth shafts at its other end, said second arm being so arranged as to be pivoted by means of the motion of said first arm, the point of application of the motion of said first arm onto said second arm being adjustable, whereby the motion of said third and fourth shafts in a direction parallel to their axis is adjustable; a hub fixed to the open end of said third shaft; a plurality of arms extending radially from said hub; and work holding means fixed to the ends of said arms, said work holding means being actuatable by the rotation of said fourth shaft.

2. In a loading and unloading mechanism for production machines, in combination: a central hub; a plurality of arms extending radially from said hub; work carrying means fixed to the radially outer ends of said arms; means for rotating said hub, last said means including first gearing drivingly connected to said hub, a cam, second gearing driven by said cam, and means for intermittently connecting said first and second gearings; means for moving said arms in a direction perpendicular to the plane of their array, last said means including a first arm, one end of said arm being drivingly connected to aforesaid hub and the other end of said arm being pivotably fixed with respect to the entire machine, a second arm pivotable in the same plane as said first arm, means for pivoting said second arm, means for drivingly connecting said first and second arms along their pivotable length, and means for adjusting the position of last said connecting means along the pivotable lengths of said first and said second arms; and means for actuating said work carrying means.

3. In a loading and unloading mechanism for production machines, in combination: a central hub; a plurality of arms extending radially from said hub; work carrying means fixed to the radially outer ends of said arms; means for rotating said hub including first gearing drivingly connected to said hub, a cam, second gearing driven by said cam, and means for intermittently drivingly connecting said first and said second gearings; means for moving said arms in a direction perpendicular to the plane of their array; and means for actuating said work carrying means.

4. In a loading and unloading mechanism for production machines, in combination: a plurality of work carrying means; means to actuate said work carrying means; means for lifting said work carrying means, last said means including a first arm, one end of which being pivotably fixed with respect to the entire machine, the other end of which being drivingly connected to said work carrying means, a second arm being fixed to pivot in a plane parallel to the plane of pivotation of the first arm, means for pivoting said second arm, means for drivingly connecting said first and said second arms along their pivoting lengths, and means for adjusting the point of connection of said first and said second arms along their pivotable lengths.

5. In a loading and unloading mechanism for production machines, in combination: a central hub; a plurality of arms extending radially from said hub; work carrying means fixed to the radially outer ends of said arms; means for rotating said hub; means for moving said arms in a direction perpendicular to the plane of their array, last said means including a first arm one end of which is drivingly connected to aforesaid hub and the other end of which is pivotably fixed with respect to the entire machine, a second arm, pivotable in the same plane as said first arm, means for pivoting said second arm, and means for connecting said first and said second arms along their pivotable length; and means for actuating said work carrying means.

6. In a loading and unloading mechanism for production machines; a central hub; a plurality of arms extending radially from said hub; work carrying means fixed to the radially outer end of said arms; means for rotating said hub; means for reciprocating said hub in an axial direction whereby said arms are moved in directions perpendicular to the plane of their array; and means for actuating said work carrying means.

7. A mechanical movement including, in combination: a constantly rotated cam; a first carrier driven by said cam reciprocally along a line; a second carrier driven by said cam reciprocally in a line perpendicular to the line path of said first carrier; a gear rack fixed to said first carrier; a first hollow shaft rotatably attached to and carried by said second carrier, the axis of said first shaft being parallel to the path of motion of said second carrier; a gear drivingly attached to said first shaft and so arranged as to be in mesh and driven by aforesaid gear rack when said second carrier is at one extreme of its position, and to be out of mesh with aforesaid gear rack when said second carrier is at the other extreme of its position; a second shaft internal to and rotatably carried by said first shaft; a gear drivingly attached to said second shaft and so positioned as to be in mesh with and driven by aforesaid gear rack; a third shaft co-linear with and drivingly splined at one end of said first shaft; a fourth shaft co-linear with and drivingly splined at one end to said second shaft; said fourth shaft being internal to said third shaft; means for reciprocating said third and fourth shafts along the line of their axis, said means consisting of a bell crank, one end of which is rotated by said second carrier, a first arm, one end of which is pivotably fixed relative to the entire mechanism, said first arm being arranged so as to be pivoted by the motion of said bell crank, a second arm pivotably fixed with respect to the entire machine at one end and attached to said third and fourth shafts at its other end, said second arm being so arranged as to be pivoted by means of the motion of said first arm, the point of application of the motion of said first arm onto said second arm being adjustable, whereby the motion of said third and fourth shafts in a direction parallel to their axis is adjustable .

8. In a mechanical movement, in combination: a constantly rotating cam; a first carrier reciprocally driven by said cam along a line path; a second carrier reciprocally driven by said cam along a line path perpendicular to the line path of said first carrier; a gear rack fixed to said first carrier; a first shaft, rotatably fixed to said second carrier; a first gear drivingly connected to said first shaft and so arranged as to engage said gear rack at such times as said first carrier is at one extreme of its positions of travel; a second shaft, rotatably fixed to said second carrier; and a second gear drivingly connected to said second shaft and arranged to constantly mesh with said gear rack.

9. In a mechanical movement, in combination: a constantly rotating cam; a first carrier driven along a line by said cam and a second carrier driven by said cam along a line perpendicular to the line path of said first cam, the time relation of travel of said first and second carriers being such that only one carrier is in motion at any instant, the other carrier being dwelling at one extreme position of its travel; first gearing driven by the motion of said first carrier; second gearing rotatively fixed to said second carrier, said second gearing being so arranged as to mesh with said first gearing at only such times as said second carrier is at one extreme position of its travel.

10. In a mechanical movement; a constantly rotating cam; a first carrier reciprocally driven by said cam along a line path perpendicular to said line path perpendicular to the line path of said first carrier; a gear rack fixed to said first carrier; a first shaft, rotatably fixed to said second carrier; a first gear drivingly connected to said first shaft and so arranged as to engage said gear rack at such times as said first carrier is at one extreme of its positions of travel; a second shaft, rotatably fixed to said second carrier; and a second gear drivingly connected to said second shaft and arranged to constantly mesh with said gear rack. And means for fixing said first shaft against rotation at such times as said first gear is not engaging said gear rack, last said means including a pin so positioned as to engage said first shaft at such times as said second carrier is at an extreme of position opposite to that extreme of position at which said first gear is engaging said rack.

References Cited in the file of this patent

UNITED STATES PATENTS

| | | |
|---|---|---|
| 1,943,483 | Miller | Jan. 16, 1934 |
| 2,408,599 | Bennett | Oct. 1, 1946 |